(12) United States Patent
Norkin (10) Patent No.: US 10,839,489 B2
(45) Date of Patent: Nov. 17, 2020

(54) TECHNIQUES FOR SYNTHESIZING FILM GRAIN

(71) Applicant: NETFLIX, INC., Los Gatos, CA (US)

(72) Inventor: Andrey Norkin, Campbell, CA (US)

(73) Assignee: NETFLIX, INC., Los Gatos, CA (US)

(*) Notice: Subject to any disclaimer, the term of this patent is extended or adjusted under 35 U.S.C. 154(b) by 150 days.

(21) Appl. No.: 16/108,069

(22) Filed: Aug. 21, 2018

(65) Prior Publication Data

US 2019/0066272 A1 Feb. 28, 2019

Related U.S. Application Data

(60) Provisional application No. 62/548,885, filed on Aug. 22, 2017.

(51) Int. Cl.
| | |
|---|---|
| *G06T 5/00* | (2006.01) |
| *G06T 3/40* | (2006.01) |
| *G06T 7/90* | (2017.01) |
| *G06T 3/20* | (2006.01) |
| *H04N 19/85* | (2014.01) |
| *H04N 19/44* | (2014.01) |
| *H04N 19/186* | (2014.01) |

(52) U.S. Cl.
CPC ............... *G06T 5/002* (2013.01); *G06T 3/20* (2013.01); *G06T 3/40* (2013.01); *G06T 7/90* (2017.01); *G06T 2207/20204* (2013.01); *H04N 19/186* (2014.11); *H04N 19/44* (2014.11); *H04N 19/85* (2014.11)

(58) Field of Classification Search
None
See application file for complete search history.

(56) References Cited

U.S. PATENT DOCUMENTS

| | | | |
|---|---|---|---|
| 2006/0256853 A1* | 11/2006 | Schlockermann | H04N 19/50 375/240.03 |
| 2006/0256873 A1 | 11/2006 | Gomila et al. | |
| 2009/0002379 A1* | 1/2009 | Baeza | H04N 19/46 345/522 |

FOREIGN PATENT DOCUMENTS

WO 2004/104931 A1 12/2004

OTHER PUBLICATIONS

International Search Report for PCT Application No. PCT/US2018/047596 dated Nov. 6 2018, 19 pages.

(Continued)

*Primary Examiner* — Fayyaz Alam
(74) *Attorney, Agent, or Firm* — Artegis Law Group, LLP (57) ABSTRACT

In various embodiments, a reconstruction application generates reconstructed video content that includes synthesized film grain. The reconstruction application performs scaling operation(s) on first unit noise based on a piecewise linear scaling function and the brightness component of the decoded video content to generate a brightness component of synthesized film grain. The reconstruction application then generates a brightness component of reconstructed video content based on the brightness component of the synthesized film grain and the brightness component of the decoded video content. Finally, the reconstructed application performs operation(s) related to saving the reconstructed video content to a file and/or further processing the reconstructed video content. Advantageously, the synthesized film grain reliably represents the film grain included in source video content from which the decoded video content was derived.

20 Claims, 4 Drawing Sheets

(56) References Cited

OTHER PUBLICATIONS

Norkin et al., "Film Grain Synthesis for AV1 Video Codec", 2018 Data Compression Conference, IEEE, Mar. 27, 2018, pp. 3-12.
Gomila et al., "SEI message for film grain encoding", Joint Video Team (JVT) of ISO/ IEC MPEG & ITU-T VCEG(ISO/IEC JTC1/SC29/WG11 and ITU-T SG16 Q6), May 23-27, 2003, 14 pages.
Oh et al., "Advanced Film Grain Noise Extraction and Synthesis for High-Definition Video Coding", IEEE Transactions on Circuits and Systems for Video Technology, vol. 19. No. 12, Dec. 1, 2009, 13 pages.

\* cited by examiner

TECHNIQUES FOR SYNTHESIZING FILM GRAIN

CROSS-REFERENCE TO RELATED APPLICATIONS

This application claims the priority benefit of the United States Provisional Patent Application titled, "TECHNIQUES FOR FILM GRAIN MODELING AND SYNTHESIS," filed Aug. 22, 2017 and having Ser. No. 62/548,885. The subject matter of this related application is hereby incorporated herein by reference.

BACKGROUND

Field of the Various Embodiments

Embodiments of the present invention relate generally to streaming video content and, more specifically, to techniques for synthesizing film grain.

Description of the Related Art

Film grain is a random optical effect originally attributable to the presence of small particles of metallic silver, or dye clouds found on processed photographic film. During playback of a media title using video content that includes film grain, the film grain appears as imperfections that provide a distinctive "movie" look that is aesthetically valued by many producers and viewers of the video content. By contrast, during playback of a media title using video content that does not include film grain, the lack of the film grain "imperfections" often appears artificial. However, film grain is a type of noise and, because noise is less predictable than other video content, encoding noise is exceedingly inefficient. For this reason, many video streaming service providers remove noise, including film grain, from source video content prior to encoding. The resulting encoded, de-noised video content is then transmitted to various client devices for playback. When those client devices receive and decode the encoded video content, the resulting decoded video content, which is used for playback of the media title, does not include film grain.

To avoid the above issues and provide the aesthetically-pleasing movie look during playback of a media title, some video streaming service providers or broadcasters implement a film grain modeling application that models film grain in source video content using a variety of film grain parameters. For each media title, the video streaming service provider or broadcaster transmits the film grain parameters along with the encoded video content to client devices. Each client device can implement a reconstruction application that synthesizes the film grain based on the film grain parameters. The reconstruction application combines the synthesized film grain with the decoded video content to generate reconstructed video content that is subsequently used for playback of the media title.

In one approach to modeling film grain, the film grain modeling application generates film grain parameters based on an auto-regressive model for unit variance noise and a linear scaling assumption that the film grain value is additive or multiplicative to the values of the red, green, and blue color components of the relevant video content represented in the RGB color space. More precisely, for each color component, the film grain modeling application computes different film grain parameters that characterize the film grain associated with the color component based on the auto-regressive model, the linear scaling assumption, the de-noised video content and the source video content. In a complementary fashion, the reconstruction application generates synthesized film grain associated with each color component based on the auto-regressive model, the linear scaling assumption, the decoded video content, and the film grain parameters.

One drawback of the above film grain modeling approach is that the linear scaling assumption is not valid for all video content. Consequently, the synthesized film grain may not accurately replicate the actual film grain included in the original source video content. In such cases, the user viewing experience during playback of the media title can be degraded. Another drawback of the above approach is that the number of bits required to encode video content in the YCbCr color space is typically significantly less than the number of bits required to encode the video content in the RGB color space. As a result, encoding video content in the RGB color space needlessly increases the resources required to store and transmits the encoded video content. For this reason, encoding and decoding operations are typically performed in the YCbCr color space. By contrast, the film grain modeling application and the reconstruction application operate in the RGB color space, thereby requiring time-consuming color space conversions. Other conventional approaches to film grain modeling and reconstruction involve similarly unreliable assumptions and/or processing inefficiencies.

As the foregoing illustrates, what is needed in the art are more effective techniques for synthesizing film grain when streaming media titles.

SUMMARY

One embodiment of the present invention sets forth a computer-implemented method for synthesizing film grain. The method includes performing one or more scaling operations on first unit noise based on a first piecewise linear scaling function and a brightness component of decoded video content associated with a media title to generate a brightness component of synthesized film grain; generating a brightness component of reconstructed video content associated with the media title based on the brightness component of the synthesized film grain and the brightness component of the decoded video content; and performing at least one operation related to at least one of saving the reconstructed video content to a file and further processing the reconstructed video content.

At least one technical advantage of the disclosed techniques relative to prior art solutions is that, with the disclosed techniques, the synthesized film grain more reliably represents the film grain included in the source video content. In particular, for each component included in source video content represented in a YCbCr color space, piecewise linear scaling functions accurately model the correlation between the values of associated decoded video content and the intensities of the film grain. Further, generating the synthesized film grain via the disclosed techniques does not involve the time-consuming color space conversions typically required by prior art approaches. In alternate embodiments, the disclosed techniques can be advantageously extended to other brightness-based color spaces or to the RGB color space. In such embodiments, the disclosed techniques increase the accuracy with which the synthesized film grain replicates the actual film grain included in the original source video content relative to prior art solutions.

These technical advantages provide one or more technological advancements over the prior art.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Film grain refers to imperfections in video content that provide a distinctive "movie" look during playback of an associated media title. In relatively old movies, film grain is a random optical effect attributable to the presence of small particles of metallic silver, or dye clouds found on processed photographic film. In more recent video content associated with digital video production chains, film grain may be generated and added to video content to avoid an artificially "smooth" look during playback of an associated media title. In general, the movie look attributable to film grain in video content is aesthetically valued by many producers and viewers of the video content.

However, film grain is a type of noise and because noise is unpredictable, encoding noise is inherently inefficient. Further, encoding source video content that includes film grain may partially remove and distort the film grain. For this reason, many video streaming service providers remove noise, including film grain, from source video content prior to encoding the resulting de-noised video content for transmission to various client devices for playback. The resulting encoded, de-noised video content is then transmitted to various client devices for playback. When those client devices receive and decode the encoded video content, the resulting decoded video content, which is used for playback of the media title, does not include film grain.

To enable those client devices to provide the aesthetically-pleasing movie look during playback of the media title, some video streaming service providers implement a conventional film grain modeling application. The film grain modeling application generates a variety of film grain parameters that model film grain in source video content. For each media title, the video streaming service provider transmits the film grain parameters along with the encoded video content to client devices. Each client device can implement a conventional reconstruction application that synthesizes the film grain based on the film grain parameters. The conventional reconstruction application combines the synthesized film grain with the decoded video content to generate reconstructed video content that is subsequently used for playback of the media title.

In one approach to modeling the film grain, the conventional film grain modeling application generates film grain parameters based on a unit variance noise model for the underlying structure of the film grain and a linear scaling assumption that the film grain value is additive or multiplicative to the values of the red, green, and blue color components of the relevant video content in the RGB color space. The conventional reconstruction application generates synthesized film grain based on the unit variance noise model, the linear scaling assumption, the decoded video content, and the film grain parameters.

One drawback of the above film grain approach is that the linear scaling assumption is not valid for all video content. Consequently, the synthesized film grain may not accurately replicate the actual film grain included in the original source video content. In such cases, the user viewing experience during playback of the media title can be degraded. Another drawback of the above approach is that digital source video content and encoded video content are typically represented in the YCbCr color space. By contrast, the conventional film grain modeling application and the conventional reconstruction application operate in the RGB color space, thereby requiring inefficient color space conversions. Other conventional approaches to film grain modeling and reconstruction involve similarly unreliable assumptions and/or processing inefficiencies.

With the disclosed techniques, however, a video streaming service provider can increase the accuracy of the synthesized film grain while avoiding inefficient translations. In operation, for each component of source video content represented in the YCbCr color space, a film grain modeling application generates a piecewise linear scaling function that accurately models the correlation between the de-noised video content and the film grain. The film grain modeling application then generates film grain parameters representing the piecewise linear scaling functions as well as film grain parameters associated with a unit variance noise model. A reconstruction application included in a compatible client device generates synthesized film grain based on the unit variance noise model, the decoded video content, and the film grain parameters. The conventional reconstruction application then combines the decoded video content and the synthesized film grain to generate reconstructed video content used for playback of the media title.

Advantageously, the film grain synthesis application and the reconstruction application address various drawbacks of conventional film grain synthesis applications and conventional reconstruction applications. In particular, the piecewise linear scaling functions enable the reconstruction application to generate synthesized film grain that more reliably represents the film grain included in the source video content. Further, because the piecewise linear scaling functions are associated with the YCbCr color space, neither the film grain synthesis application nor the reconstruction application requires time-consuming color space conversion operations. In alternate embodiments, the disclosed techniques can be advantageously extended to other brightness-based color spaces or to the RGB color space. In such embodiments, the disclosed techniques increase the accuracy with which the synthesized film grain replicates the actual film grain included in the original source video content relative to prior art solutions. These technical advantages provide one or more technological advancements over the prior art.

System Overview

Figure 1:
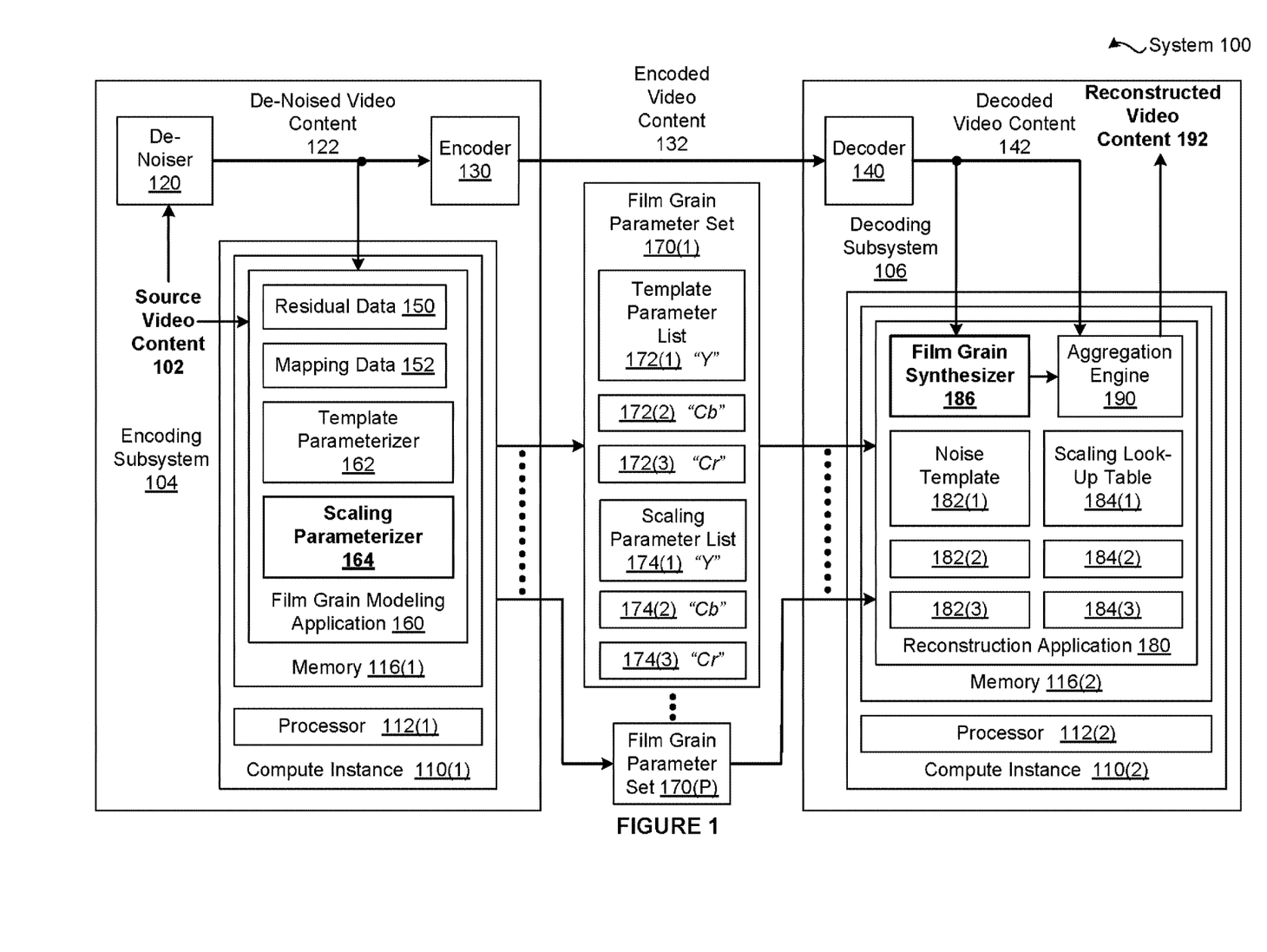
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, an encoding subsystem 104 and a decoding subsystem 106. For explanatory purposes, multiple instances of like objects are denoted with reference numbers identifying the object and parenthetical numbers identifying the instance where needed. In various embodiments, any number of the components of the system 100 may be distributed across multiple geographic locations or implemented in one or more cloud computing environments (i.e., encapsulated shared resources, software, data, etc.) in any combination.

The encoding subsystem 104 is associated with a video streaming service provider. By contrast, the decoding subsystem 106 is associated with a client of the video streaming service provider. The encoding subsystem 104 and the decoding subsystem 106 may communicate in any technically feasible fashion. For example, the encoding subsystem 104 could be implemented in a public cloud, the decoding subsystem 106 could be implemented in a client device, and the encoding subsystem 104 and the decoding subsystem 106 could communicate via the Internet. Examples of client devices include, without limitation, smart television sets, game consoles, tablets, and laptops, to name a few. In alternate embodiments, the system 110 may include any number of encoding subsystems 104 that are associated with any number of video streaming service providers and any number of decoding subsystems 106 that are associated with any number of clients in any combination. Together, the encoding subsystem 104 and the decoding subsystem 106 efficiently and accurately stream high-quality video content associated with a media title to enable playback of the media title via a client device. In general, as referred to herein, video content may include one or more images, one or more frames, and/or any amount of other visual content.

As shown, the encoding subsystem 104 includes, without limitation, a de-noiser 120, an encoder 130, and a compute instance 110(1). Because noise is prohibitively inefficient to encode, the de-noiser 102 performs noise removal operations on source video content 102 associated with the media title to generate de-noised video content 122. The encoder 130 then performs encoding operations on the de-noised video content 122 to generate encoded video content 132. Notably, the encoder 130 performs the encoding operations in the YCbCr color space in which digital video content is typically provided.

In the YCbCr color space, video content is represented as a luma component (Y), a blue-difference chroma component (Cb), and a red-difference chroma component (Cr). More specifically the brightness associated with video content is represented via the Y component, and the color associated with the video content is represented via the Cb component and the Cr component. The Cb component is the difference between the blue color component and the Y component, while the Cr component is the difference between the red color component and the Y component. The video content includes any number of frames, each frame of each component may include any number of samples, and the number of samples may differ between the components. Each sample has a value and the value is also referred to herein as a "sample value." In alternate embodiments, the video content includes, without limitation, one or more images.

The YCbCr color space is a brightness-based color space. In general, a "brightness-based" color space describes color using a brightness component and two color-related components. As referred to herein, a "color-related" component is a color component or a color difference component. In the YCbCr color space, the brightness component is the Y component and the two color-related components are the Cb and the Cr components. Examples of other brightness-based color spaces include, without limitation, Y'CbCr, YUV, YIQ, YPbPr, and ICtCp, to name a few. In alternate embodiments, the video content may be represented in any color space and the techniques described herein are modified accordingly.

The encoder 130 typically optimizes encoding operations based on differences in how the human eye processes color and brightness. For instance, in some embodiments, because human eyes are less sensitive to color than to brightness, the encoder 130 may sample the Cb and the Cr components using one sampling rate and sample the Y component using a higher sampling rate. In this fashion, the encoder 130 reduces the storage and bandwidth associated with the encoded video content 132 without sacrificing the quality of the encoded video content 132. As persons skilled in the art will recognize, encoding video content in the YCbCr color space is substantially more efficient than encoding video content in the RBG color space in which video content is represented as red, blue, and green color components.

As part of removing the noise from the source video content 102, the de-noiser 120 also removes film grain from the source video content 102. Film grain is a type of visual noise originally attributable to the presence of small particles of metallic silver, or dye clouds found on processed photographic film. Film grain includes any number of samples, and the value of a sample of film grain is also referred to herein as the value of the film grain (at the sample location). During playback of a media title using video content that includes film grain, the film grain appears as imperfections that provide a distinctive "movie" look that is aesthetically valued by many producers and viewers of the video content. By contrast, during playback of a media title using video content that does not include film grain, the lack of the film grain "imperfections" often appears artificial. As described in greater detail subsequently herein, to provide the aesthetically-pleasing movie look during playback of a media title, the compute instance 110(1) is configured to generate any number of film grain parameter sets 170 based on the source video content 102 and the de-noised video content 122. The film grain parameters set 170 includes film grain parameters that model the film grain.

When streaming the media title, the encoding subsystem 104 transmits the encoded video content 132 and the film grain parameter sets 170 to the decoding subsystem 106 in real-time. The decoding subsystem 160 includes, without limitation, a decoder 140 and a compute instance 110(2). The decoder 140 performs any amount and type of decoding operations on the encoded video content 132 to generate decoded video content 142. Notably, the decoder 130 performs the decoding operations in the YCbCr color space in which the encoded video content 132 is represented. The compute instance 110(2) is configured to generate synthesized film grain based on the film grain parameter sets 170 and the decoded video content 142. The compute instance 110(2) then aggregates the synthesized film grain and the decoded video content 142 to generate reconstructed video content 192. The reconstructed video content 192 is used by the client to playback the media title.

In one conventional approach to modeling film grain, a conventional film grain modeling application generates conventional film grain parameters based on an auto-regressive model for unit variance noise and a linear scaling assumption that the film grain value is additive or multiplicative to the values of the relevant red, green, and blue color components of video content represented in the RGB color space. First, the conventional film grain modeling application performs translation operations on the video content and the de-noised video content to convert the YCbCr components to RGB components.

Subsequently, the conventional film grain modeling application estimates the film grain and generates conventional film grain parameters that characterize the estimated film grain based on the auto-regressive model and the linear scaling assumption. As persons skilled in the art will recognize, a conventional film grain reconstruction application requires complementary color space conversion operations.

One drawback of the above conventional film grain modeling approach is that the linear scaling assumption is not valid for all video content. Consequently, the synthesized film grain may not accurately replicate the actual film grain included in the original source video content. In such cases, the user viewing experience during playback of the media title can be degraded. Another drawback of the above approach is that performing color space conversion operations is inefficient. Other conventional approaches to film grain modeling and synthesis involve similarly unreliable assumptions and/or processing inefficiencies.

Modeling Film Grain Using Piecewise Linear Scaling Functions

To address the above problems, the system 100 includes, without limitation, a film grain modeling application 160 and a reconstruction application 180 that, respectively, model the film grain and generate the reconstructed video content 192 in the YCbCr color space. The film grain modeling application 160 resides in the memory 116 and executes on the processor 112 of the compute instance 110(1). The reconstruction application 180 resides in the memory 116 and executes on the processor 112 of the compute instance 110(2).

As shown, each of the compute instances 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, each of the compute instances 110 is configured to implement one or more applications. For explanatory purposes only, each application is depicted as residing in the memory 116 of a single compute instance 110 and executing on a processor 112 of the single compute instance 110. However, as persons skilled in the art will recognize, the functionality of each application may be implemented across any number of other components included in the system 100. For instance, the functionality of each application may be distributed across any number of other applications that reside in the memories 116 of any number of compute instances 110 and execute on the processors 112 of any number of compute instances 110 in any combination. Further, the functionality of any number of applications may be consolidated into a single application or subsystem.

As shown, the film grain modeling application 160 includes, without limitation, a template parameterizer 162 and a scaling parameterizer 164. As the film grain modeling application 160 receives the source video content 102 and the de-noised video content 122, the film grain modeling application 160 determines residual data 150 and mapping data 152. The residual data 150 reflects the structure and intensities of the film grain while the mapping data 152 reflects the structure and values of the de-noised video content 120. The film grain modeling application 160 may determine the residual data 150 in any technically feasible fashion. For instance, in some embodiments, the film grain engine 150 subtracts the de-noised video content 122 from the source video content 102 to compute the residual data 150. In various embodiments, the film grain engine 150 may perform any amount and type of technically feasible film grain identification operations based on the source video content 102 and the decoded video content 122 to determine the residual data 150. The film grain modeling application 160 analyzes the structure and values of the de-noised video content 122 to generate the mapping data 152. The film grain modeling application 160 may perform any amount and type of analysis operations on the de-noised video content 122 to determine any amount and type of mapping data 152 in any technically feasible fashion.

The film grain modeling application 160 generates the film grain parameter sets 170 based on the residual data 150 and the mapping data 152. In general, each film grain parameter set 170 characterizes the film grain for a discrete portion of the source video content 102 that includes one or more frames having similar de-noised video content 122. Any number of different discrete portions of the source video content 102 may be associated with a given film grain parameter set 170 in any technically feasible fashion. For instance, in some embodiments, each film grain parameter set 170 models the film grain associated with a different frame. In other embodiments, each film grain parameter set 170(i) models the film grain associated with one or more frames included in the $i^{th}$ group of pictures (GOP), and each frame included in the $i^{th}$ GOP is associated with the film grain parameter set 170(i).

As shown, each film grain parameter set 170 includes, without limitation, three template parameter lists 172 and three scaling parameter lists 174. The template parameter list 172(1) and the scaling parameter list 174(1) characterize the film grain included in the Y component of the associated portion of the source video content 122. The template parameter list 172(2) and the scaling parameter list 174(2) characterize the film grain included in the Cb component of the associated portion of the source video content 122. The template parameter list 172(3) and the scaling parameter list 174(3) characterize the film grain included in the Cr component of the associated portion of the source video content 122.

To compute the film grain parameter set 170 associated with a particular portion of the source video content 122, the film grain modeling application 160 selects relatively smooth area(s) within the frame(s) based on the mapping data 152, avoiding edges and textures. The film grain modeling application 160 then estimates the film grain within the selected areas based on the residual data 150. In alternate embodiments, the film grain modeling application 160 may select the areas and estimate the film grain based on the source video content 102 and the de-noised video content 122 in any technically feasible fashion.

Subsequently, the template parameterizer 162 generates the template parameter lists 172 included in the template parameter set 170 based on the estimated film grain. The template parameter list 172(1) includes, without limitation, the correlation coefficients for an auto-regressive model for the Y component of zero-mean normalized film grain. For instance, in some embodiments, the template parameter list 172(1) includes, without limitation, the correlation coefficients a1-a6 for the following equation (1):

$$N = a1*A + a2*B + a3*C + a4*D + a5*E + a6*F + \text{sigma}*n \quad (1)$$

In equation (1), N is a sample of the Y component of the zero-mean normalized film grain, sigma is the estimated noise standard deviation, and n is unit variance Gaussian noise. A-F are samples in the neighborhood of N within the Y component of the zero-mean normalized film grain. Typically (but not necessarily), the locations of A-F are selected in the raster scanning order.

The template parameter list 172(2) includes, without limitation, the correlation coefficients a1-a7 for an auto-regressive model for the Cb component of zero-mean normalized film grain, where the correlation coefficient a7 represents the correlation with the Y component. Similarity, the template parameter list 172(3) includes, without limitation, the correlation coefficients a1-a7 for an auto-regressive model for the Cr component of zero-mean normalized film grain, where the correlation coefficient a7 represents the correlation with the Y component. In alternate embodiments, each of the template parameter lists 172 may include any number of coefficients associated with film grain in any technically feasible fashion.

The template parameterizer 162 may generate the template parameter lists 172 in any technically feasible fashion. For instance, in some embodiments, the template parameterizer 162 normalizes the estimated film grain to generate normalized film grain. The template parameterizer 162 then estimates the correlation coefficients, for example, based on the Yule-Walker equations and the normalized film grain.

As persons skilled in the art will recognize, an auto-regressive model can accurately capture many properties of film grain. For example, the auto-regressive models described herein capture the appearance of the film grain. However, these auto-regressive models do not capture the correlation between reduced-noise video content and the estimated film grain. As referred to herein "reduced-noise video content" is video content that does not include noise (or film grain) or video content with significantly reduced noise (or film grain), such as the de-noised video content 122 or the decoded video content 142.

To enable accurate reconstruction of the estimated film grain, the scaling parameterizer 164 generates the scaling parameter lists 174 included in the template parameter set 170. In general, for each component in the YCbCr color space, the scaling parameterizer 164 generates the associated scaling parameter list 174 based on the de-noised video content 122 and the standard deviation of the estimated film grain.

The scaling parameter list 174(1) describes a piecewise linear scaling function (not shown in FIG. 1) that maps values of a reduced-noise Y component to scaling factors for unit variance noise. In alternate embodiments, unit variance noise is replaced with "unit noise" and may or may not have a variance of exactly 1.0. As described in greater detail herein, unit variance noise may be synthesized from the template parameter list 172(1). Together, the scaling parameter list 174(1) and the template parameter list 172(2) enable the reconstruction application 180 to generate the Y component of the reconstructed video content 192 based on the following equations (2) and (3):

$$Y' = Y + f(z)*n \quad (2)$$

$$z = Y \quad (3)$$

In equations (2) and (3), Y' is the Y component of the reconstructed video content 192, Y is the Y component of the decoded video content 142, and n is unit variance noise. In equation 2, f(z) is the piecewise linear scaling function defined by the scaling parameter list 174(1). In equation 3, z is the "reduced-noise signal index" associated with the scaling parameter list 174(1).

The scaling parameter list 174(2) describes a piecewise linear scaling function that maps a linear combination of values of the Cb and the Y components of reduced-noise video content to scaling factors for unit variance noise. The unit variance noise may be synthesized from the template parameter list 172(2). Together, the scaling parameter list 174(2) and the template parameter list 172(2) enable the reconstruction application 180 to generate the Cb component of the reconstructed video content 182 based on the following equations (4) and (5):

$$Cb' = Cb + f(z)*n \quad (4)$$

$$z = Cb*m_{Cb} + Y*m_{Y,Cb} + \text{Offset}_{Cb} \quad (5)$$

In equations (4) and (5), Cb' is the Cb component of the reconstructed video content 192, Cb is the Cb component of the decoded video content 142, n is unit variance noise, and z is the reduced-noise signal index associated with the scaling parameter list 174(2). In equation 4, f(z) is the piecewise linear scaling function defined by the scaling parameter list 174(2). The value of z is the average value corresponding to the values of Z. For example, Y=(Y1+Y2+Y3+Y4)>>2 in the case of four co-located samples included in the Y component. Further, in equation (5), $m_{cb}$ is a multiplier, $m_{Y,Cb}$ is a multiplier, and offset$_{Cb}$ is an offset.

Similarly, the scaling parameter list 174(3) describes a piecewise linear scaling function that maps a linear combination of the Cr and the Y components of reduced-noise video content to scaling factors for unit variance noise. The unit variance noise may be synthesized from the template parameter list 172(3). Together, the scaling parameter list 174(3) and the template parameter list 172(3) enable the reconstruction application 180 to generate the Cr component of the reconstructed video content 182 based on the following equations (6) and (7):

$$Cr' = Cr + f(z)*n \quad (6)$$

$$z = Cr*m_{Cr} + Y*m_{Y,Cr} + \text{offset}_{Cr} \quad (7)$$

In equations (6) and (7), Cr' is the Cr component of the reconstructed video content 192, Cr is the Cr component of the decoded video content 142, n is unit variance noise, and z is the reduced-noise signal index associated with the scaling parameter list 174(3). In equation 6, f(z) is the piecewise linear scaling function defined by the scaling parameter list 174(3). Further, in equation (7), $m_{c_r}$ is a multiplier, $m_{Y,Cr}$ is a multiplier, and offset$_{Cr}$ is an offset.

In alternate embodiments, the scaling parameterizer 164 may generate the piecewise linear scaling functions based on any equations, the source video content 102, and the denoised video content 122 in any technically feasible fashion. For instance, in some embodiments, the scaling parameterizer 164 generates a piecewise linear scaling function that modulates the film grain based on the following equations (8) and (9):

$$Y'=Y+f(z)*n \quad (8)$$

$$z=Y*m_{Y,Y}+Cb*m_{Cb,y}+Cr*m_{Cr,y}+\text{offset} \quad (9)$$

In equations (8) and (9), Y' is the Y component of the reconstructed video content 192, Y is the Y component of the decoded video content 142, n is unit variance noise, and z is the reduced-noise signal index associated with the scaling parameter list 174(1). Notably, z is normalized after performing the operations in equation (9). The re-normalization may be performed in any technically feasible fashion (e.g., using the right shift operation). In equation (9), $m_{Y,Y}$ is a multiplier, $m_{Cb,y}$ is a multiplier, $m_{Cr,y}$ is a multiplier, and offset is an offset.

Each scaling parameter list 174 may define the associated piecewise linear scaling function in any technically feasible fashion. For instance, in some embodiments, the scaling parameter list 174 defines the piecewise linear scaling function using any number of points (not shown in FIG. 1). Each point maps a reduced-noise signal index to a scaling factor for unit variance noise. Sequentially connecting the points included in the scaling parameter list 174 via straight lines produces the associated piecewise linear scaling function. An example of computing the piecewise linear scaling function and the scaling parameter list 174(1) associated with the Y component of a frame is described in greater detail in conjunction with FIG. 2.

During streaming of the media title, the reconstruction application 180 generates the reconstructed video content 182 based on the decoded video content 142 and the film grain parameter sets 170. As shown, the reconstruction application 180 includes, without limitation, a film grain synthesizer 186, noise templates 182, scaling look-up tables 184, and an aggregation engine 190. For each film grain parameter set 170, the film grain synthesizer 186 generates a different set of three noise templates 182 and a different set of three scaling look-up tables 184.

The film grain synthesizer 186 generates the noise template 182(i) included in a given film grain parameter set 170 based on the template parameter list 172(i). More precisely, the film grain synthesizer 186 pseudo-randomly generates an AxB (e.g., 64×128) block of numbers. The film grain synthesizer 186 may generate the pseudo-random block in any technically feasible fashion. For instance, in some embodiments, the film grain synthesizer 186 generates the pseudo-random block using a pseudo-random number generator. In other embodiments, the film grain synthesizer 186 generates the pseudo-random block based on a stored white Gaussian noise pattern.

In various embodiments, the size of the pseudo-random block varies based on the component associated with the template parameter list 172(i). For instance, in some embodiments, as part of generating the noise template 182(1) associated with the Y component, the film grain synthesizer 186 could generate a 128×128 pseudo-random block. By contrast, as part of generating the noise template 182(2) associated with the Cb component or the noise template 182(3) associated with the Cr component, the film grain synthesizer 186 could generate a 64×64 pseudo-random block.

The film grain synthesizer 186 then performs filtering operations on the pseudo-random block based on the correlation coefficients included in the template parameter list 172(i) to generate the noise template 182(i). The size of the noise template 182(i) is typically smaller than the size of the pseudo-random block. The film grain synthesizer 186 may perform any number and type of filtering operations to generate the noise template 182(i). For instance, in some embodiments, the film grain synthesizer 186 generates the noise template 182(1) based on the equation (1), the pseudo-random block, and the template parameter list 172(1). In alternate embodiments, the pseudo-random block may be replaced with an array or a sequence.

The film grain synthesizer 186 generates the scaling look-up table 184(i) based on the scaling parameter list 172(i) included in the film grain parameter list 170. The scaling look-up table 184(i) includes, without limitation, a different scaling factor for each possible reduced-noise signal index. For example, the scaling look-up table 184(2) associated with the Cb component and 8-bit video content would include 256 8-bit reduced-noise signal indices. By contrast, the scaling look-up table 184(2) associated with the Cr component and 10-bit video content may include 1024 8-bit signal indices. The film grain synthesizer 186 computes each scaling factor included in the scaling look-up table 184(i) based on the piecewise linear scaling function defined by the scaling parameter list 172(i) and the associated reduced-noise signal index in any technically feasible fashion. For instance, depending on the component associated with the scaling look-up table 184(i), the film grain synthesizer 186 may compute the scaling factors based on equation 2, 4, or 6.

Although not shown in FIG. 1, the film grain synthesizer 186 and the aggregation engine 190 process the decoded video content 122 as any number of decoded blocks. Each decoded block is associated with a different combination of component and spatial portion of a decoded frame. Notably, the size of the decoded blocks may vary between components. For instance, in some embodiments having different sampling rates for the different components, the Y component includes 64×64 decoded blocks, while each of the Cb and Cr components includes 32×32 decoded blocks. However, for a given component, the size of a decoded block is less than the size of the associated noise templates 182.

For each decoded block, the film grain synthesizer 186 generates an associated scaled noise block (not shown in FIG. 1) based on the associated noise template 182 and the associated scaling look-up table 184. First, the film grain synthesizer 186 pseudo-randomly selects a ExF unit noise block within the CxD noise template 182, where ExF is the size of the decoded block, E is less than or equal to C, and F is less than or equal to D. Again, E, F, C, and D may vary based on the associated component. For example, if the decoded block is included in the Y component, then the film grain synthesizer 186 could select a 64×64 unit noise block within an associated 128×128 noise template 182(1). By contrast, if the decoded block is included in the Cb or Cr component, then the film grain synthesizer 186 could select a 32×32 unit noise block within an associated 64×64 noise template 182(2) or 182(3). The film grain synthesizer 186 may select the unit noise block in any technically feasible fashion.

For instance, in some embodiments, the film grain synthesizer 186 generates pseudo-random offsets for a 64×64 unit noise block within a 128×128 noise template 182 using a shift-back linear-feedback shift register (LFSR) based on XOR of a length of 16 bits. The XOR-ed values are 16, 14, 13 and 11, which corresponds to the feedback polynomial of $x^{16}+x^{14}+x^{13}+x^{11}+1$. The film grain synthesizer 186 generates the offsets using the six least significant bits on the register. Prior to streaming the media title, the polynomial is initialized with an expression that depends on the sum of some syntax elements.

As persons skilled in the art will recognize, the unit noise block includes, without limitation, ExF unit variance noise values. In alternate embodiments, the film grain synthesizer 186 may generate unit variance noise at any granularity in any technically feasible fashion. The film grain synthesizer 186 then generates a scaled noise block (not shown in FIG. 1) based on the unit noise block, the decoded video content 142 for the frame, and the associated scaling look-up table 184. For each sample included in the decoded block, the scaled noise block includes, without limitation, the value of a corresponding sample of reconstructed film grain. The film grain synthesizer 186 may generate the scaled noise block in any technically feasible fashion.

For instance, in some embodiments, the film grain synthesizer 186 computes the reduced-noise signal index into the scaling look-up table 184 for each sample included in the decoded block. The film grain synthesizer 186 may compute the reduced-noise signal indices in any technically feasible fashion. In some embodiments, depending on the component associated with the decoded block, the film grain synthesizer 186 computes the reduced-noise signal index based on equation 3, 5, or 7. Notably, the reduced-noise signal index may depend on the values of samples included in multiple components of the decoded frame.

The film grain synthesizer 186 then maps the reduced-noise signal indices to the scaling factors based on the scaling look-up table 184 to generate a scaling block. Finally, the film grain synthesizer multiples each entry in the unit noise block and the corresponding entry in the scaling block to generate a corresponding entry in the scaled noise block. In other embodiments, the film grain synthesizer 186 computes a single reduced-noise signal index for the decoded block based on the average values of the samples included in the corresponding portion of the decoded frame.

For each decoded block, the aggregation engine 190 generates a reconstructed block included in the reconstructed video content 192 based on the decoded block and the associated scaled noise block. More specifically, to compute the $i^{th}$ reconstructed value included the reconstructed block, the aggregation engine 190 sums the $i^{th}$ reduced-noise value included in the decoded block and the $i^{th}$ film grain value included in the scaled noise block. In various embodiments, as part of computing the reconstructed video content 192, the aggregation engine 190 may perform any number of additional operations, such as clipping.

Advantageously, for each component in a brightness-based color space, the associated piecewise linear scaling functions reliably correlate the film grain included in the source video content 102 to the decoded video content 142. Consequently, synthesizing film grain based on piecewise linear scaling functions in a brightness-based color space is more accurate than synthesizing film grain based on linear scaling in the RGB color space.

Note that the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. As a general matter, the techniques outlined herein are applicable to synthesizing film grain based on piecewise linear scaling functions that map decoded video content or images to noise scaling factors for any color space. In various embodiments, the techniques described herein may be used in conjunction any type of media transmission or processing including, without limitation, streaming, broadcasting, video conferencing, and playback using a file. Further the techniques may be used to synthesize any type of noise content associated with any amount of video content, including one or more images.

In some alternate embodiments, the system 100 does not include the reconstruction application 180, and the decoder 140 generates the reconstructed video content 192 based on the film grain parameter sets 170. More precisely, the decoder 140 implements the following equation (10):

$$\text{out}(x,y) = \text{clip3}(dec(x,y) + (\text{noise}(x+\text{offset1}, y+\text{offset2}) * \\ (LUT\_\text{component}\_i[z(x,y)]) << (\text{bit\_depth}-8)), a, \\ b) \quad (10)$$

In equation 10, a is the lowest legal value and b is the highest legal value, z(x,y) is computed as was described previously herein, dec is a decoded sample value at position (x, y), and out (x, y) is the output sample value at position x, y. Clip3(x, y, z) is x when z<x, y when z>y, and z otherwise; noise(x+offset1, y+ offset 2) is the unit noise block; and LUT_component_i is the scaling look-up table 184(i). In other embodiments, any amount of the functionality of the reconstruction application 180 may be implemented in any technically feasible component. For instance, in some embodiments, the film grain synthesizer 186 may be included in a post-processing component instead of in the decoding subsystem 106.

In the same or other alternate embodiments, the techniques disclosed herein are modified for use with respect to the RGB color space. More specifically, for each component of the source video content 102 in the RGB color space, the film grain modeling application 160 generates a different piecewise linear scaling function 250 that models the associated film grain. In a complementary fashion, for each component of the decoded video content 142 in the RGB color space, the film grain synthesizer 186 generates synthesized film grain based on the associated piecewise linear scaling function 250.

In general, the functionality described herein may be implemented in any combination of software and hardware in any technically feasible fashion. For instance, any amount of the encoding process, the film grain modeling process, the decoding process, the film grain synthesis process, and/or the reconstruction process may be implemented in hardware as part of a hardware-accelerated decoding process.

Figure 2:
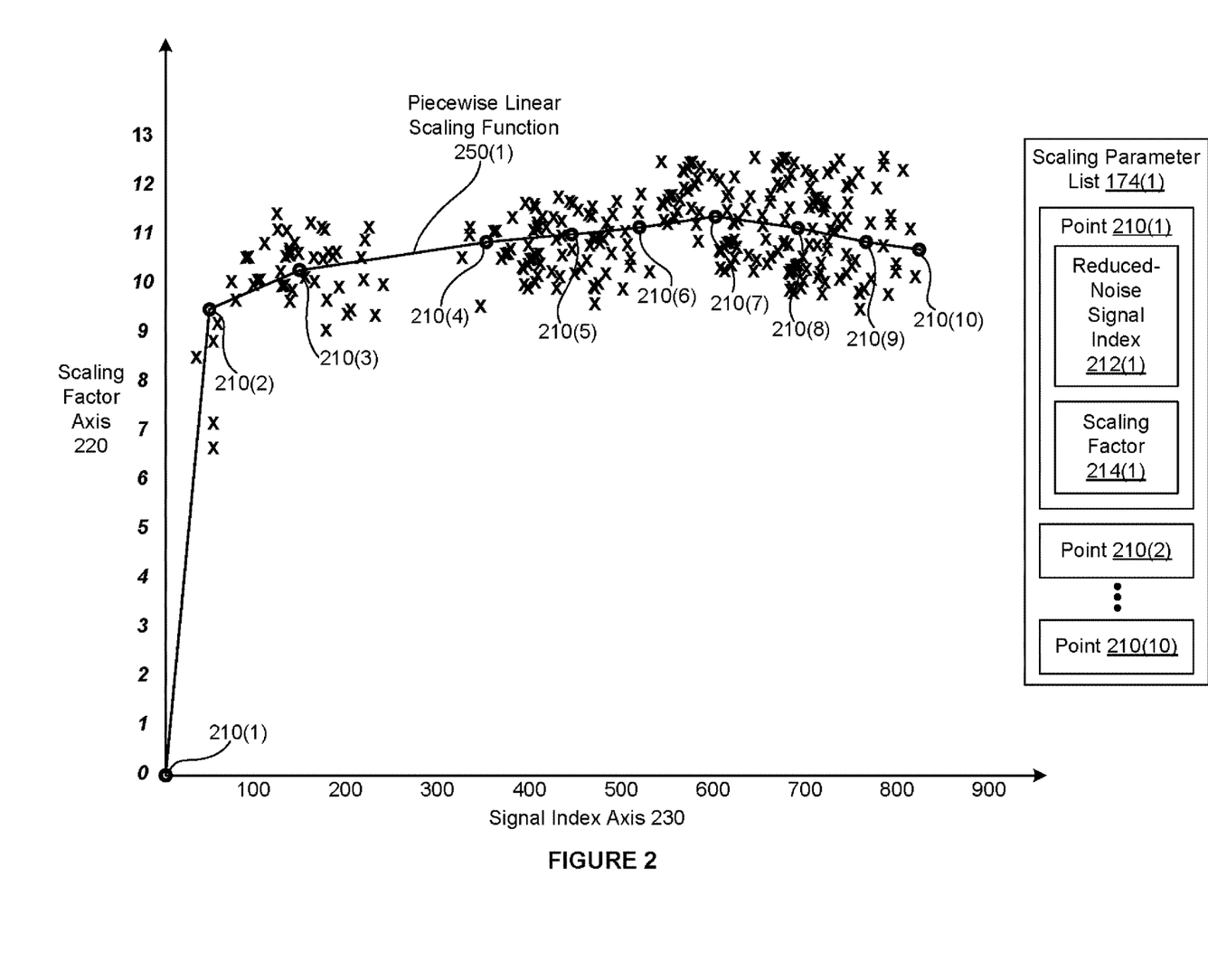
FIG. 2 illustrates an exemplary piecewise linear scaling function and a corresponding scaling parameter list that are generated by the film grain modeling application of FIG. 1, according to various embodiments of the present invention.

FIG. 2 illustrates an exemplary piecewise linear scaling function 250(1) and a corresponding scaling parameter list 174(1) that are generated by the film grain modeling application 160 of FIG. 1, according to various embodiments of the present invention. For explanatory purposes only, the film grain modeling application 160 generates the piecewise linear scaling function 250(1) and the scaling parameter list 174(1) based on the residual data 150 and the mapping data 152 associated with the Y component of one frame of the source video content 102.

In operation, the film grain modeling application 160 selects relatively smooth spatial area(s) within the Y component of the frame, avoiding edges and textures. The film grain modeling application 160 then estimates the film grain within the selected areas based on the residual 150 and the mapping data 152. For each sample included in the selected areas, the film grain modeling application 160 plots the value of the Y component of the de-noised video content 122 along the signal index axis 230 and the value of the estimated film grain along the scaling factor axis 220 to generate a plot point. For explanatory purposes only, the plot points are depicted using crosses. In alternate embodiments, the film grain modeling application 160 does not perform any plotting operations. Instead, the film grain modeling application 160 uses any number of algorithms and/or formulas to estimate the piecewise linear scaling function 250(1).

Subsequently, the film grain modeling application 160 performs any amount of data fitting operations on the plot points to generate the piecewise linear scaling function 250(1). Persons skilled in the art will understand that many techniques for generating piecewise linear scaling functions are well known in the field of mathematics. The film grain modeling application 160 may implement any number of such techniques to generate the piecewise linear scaling function 250(1).

The film grain modeling application 160 then generates the scaling parameter list 174(1) based on the piecewise linear scaling function 250(1). More specifically, the film grain modeling application 160 identifies points 210(1)-210(10) that delineate separate linear segments of the linear scaling function 250. For explanatory purposes only, the points 210 are depicted along the piecewise linear scaling function 250 using unfilled circles. The film grain modeling application 160 then adds the points 210 to the scaling parameter list 174(1). Accordingly, the scaling parameter lists 174(1) includes, without limitation, the points 210(1)-210(10). In alternate embodiments, the piecewise linear scaling function 250(1) may include any number of linear segments and the scaling parameter list 174(1) may include any number of the points 210.

As shown, the point 210(i) includes, without limitation, a reduced-noise signal index 212(i) and a scaling factor 214(i). Because the point 210(i) is associated with the Y component, the reduced-noise signal index 212(i) is a value for the Y component of reduced-noise video content. The scaling factor 214(i) is a multiplier that converts unit variance noise to film grain. As described previously herein, the reconstruction application 180 subsequently uses the scaling parameter list 174 in conjunction with equations (2) and (3) to generate the Y component of the reconstructed video content 192.

Synthesizing Film Grain in the YCbCr Color Space

Figure 3:
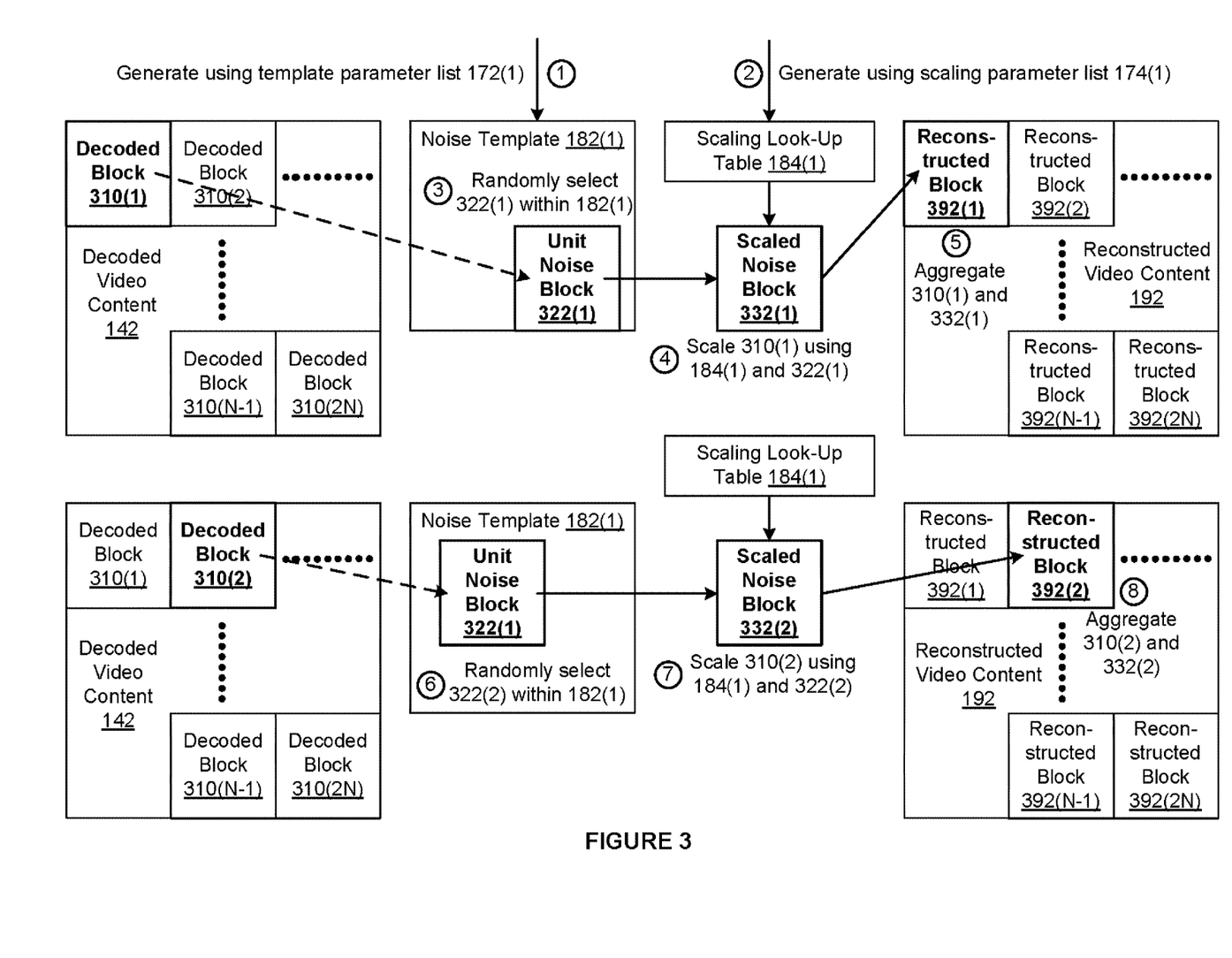
FIG. 3 illustrates how the reconstruction application of FIG. 1 generates reconstructed video content, according to various embodiments of the present invention.

FIG. 3 illustrates how the reconstruction application 180 of FIG. 1 generates the reconstructed video content 192, according to various embodiments of the present invention. More specifically, FIG. 3 depicts how the reconstruction application 180 generates reconstructed blocks 392(1) and 392(2) based on, respectively, decoded blocks 310(1) and 310(2) as a series of numbered bubbles. For explanatory purposes only, the reconstructed blocks 392(1) and 392(2) are included in the Y component of a "current" frame of the reconstructed content 192 and the decoded blocks 310(1) and 310(2) are included in the Y component of the current frame of the decoded content 142.

First, as depicted with the bubble numbered 1, the film grain synthesizer 186 generates the noise template 182(1) based on the template parameter list 172(1) associated with the Y component of the current frame. And, as depicted with the bubble numbered 2, the film grain synthesizer generates the scaling look-up table 184(1) based on the scaling parameter list 174(1) associated with the Y component of the current frame. Subsequently, the film grain synthesizer 186 pseudo-randomly selects a unit noise block 322(1) within the noise template 182(1) (depicted with the bubble numbered 3). As depicted with the bubble numbered 4, the film grain synthesizer 186 generates a scaled noise block 332(1) based on the decoded block 310(1), the scaling look-up table 184(1), and the unit noise block 322(1). The aggregation engine 190 performs per-sample summations between the decoded block 310(1) and the scaled noise block 332(1) to generate the reconstructed block 392(1) (depicted with the bubble numbered 5).

Subsequently, as depicted with the bubble numbered 6, the film grain synthesizer 186 pseudo-randomly selects the unit noise block 322(2) within the noise template 182(1). As depicted with the bubble numbered 7, the film grain synthesizer 186 then generates a scaled noise block 332(2) based on the decoded block 310(2), the scaling look-up table 184(1), and the unit noise block 322(2). Finally and as depicted with the bubble numbered 8, the aggregation engine 190 performs per-sample summations between the decoded block 310(2) and the scaled noise block 332(2) to generate the reconstructed block 392(2).

Figure 4:
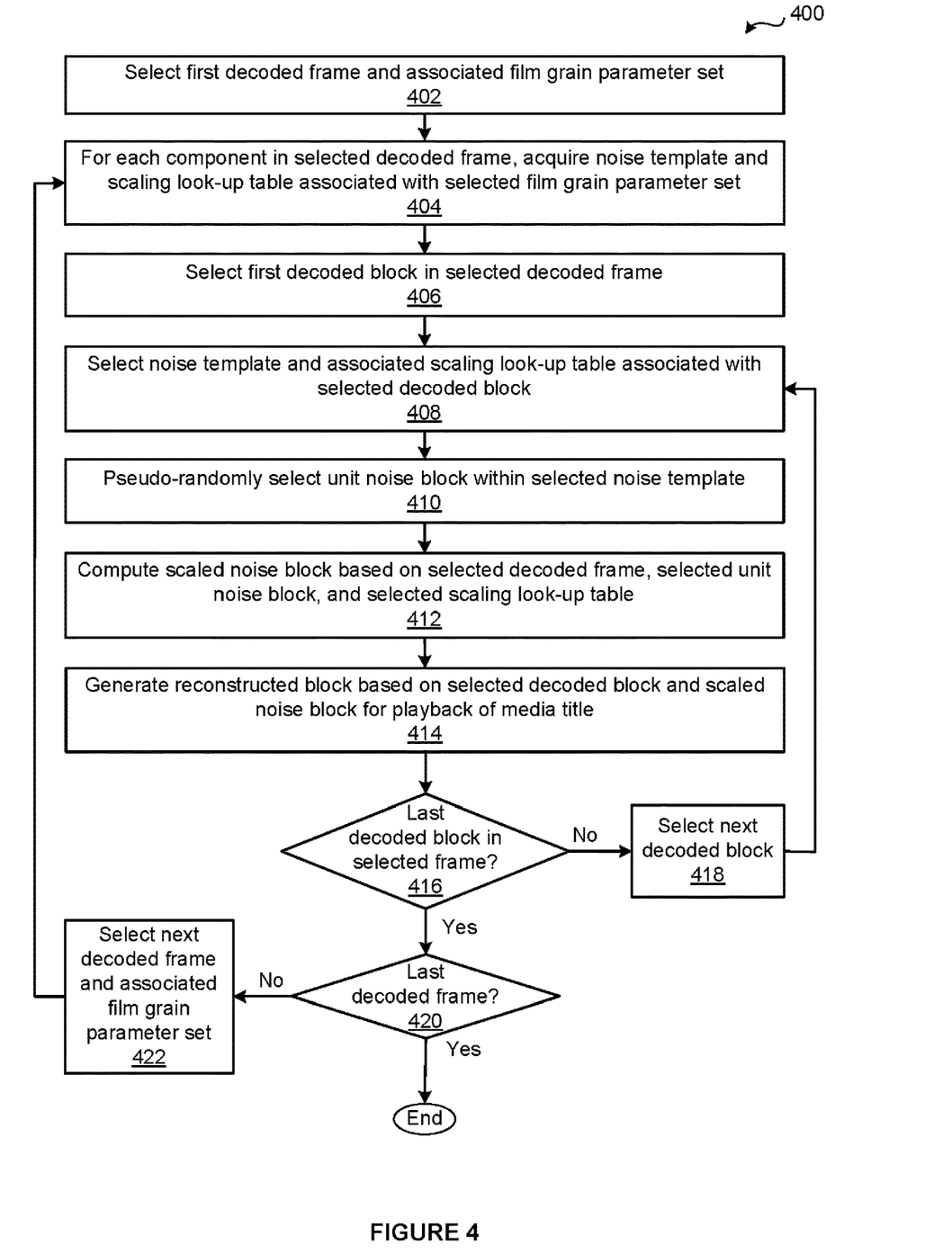
FIG. 4 is a flow diagram of method steps for synthesizing film grain for a media title, according to various embodiments of the present invention.

FIG. 4 is a flow diagram of method steps for synthesizing film grain for a media title, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 402, where the reconstruction application 180 selects the first decoded frame included in the decoded video content 142 and the associated film grain parameter set 170. At step 404, for each component included in the selected decoded frame, the film grain synthesizer 186 acquires the noise template 182 and the scaling look-up table 184 associated with the selected film grain parameter set 170. As part of step 404, if the film grain synthesizer 186 has not previously generated the noise templates 182(1)-182(3) and the scaling look-up tables 184(1)-184(3), then the film grain synthesizer 186 generates the noise templates 182(1)-182(3) and the scaling look-up tables 184(1)-184(3) based on the selected film grain parameter set 170. In alternate embodiments, each component of each decoded block within a frame may be associated with a different scaling look-up table 184 and/or a different noise template 172, and the method 400 is modified accordingly.

At step 406, the reconstruction application 180 selects the first decoded block 310 included in the selected decoded frame. As described previously herein, each decoded block 310 is associated with both a frame and a component in the YCbCr color space. At step 408, the film grain synthesizer 186 selects the noise template 182 and the scaling look-up table 184 associated with the selected decoded block 310. For instance, if the selected decoded block 310 is associated with the Y component, then the film grain synthesizer 186 selects the noise template 182(1) and the scaling look-up table 184(1) associated with the selected film grain parameter set 170.

At step 410, the film grain synthesizer 186 pseudo-randomly selects the unit noise block 322 within the selected noise template 182. At step 412, the film grain synthesizer 186 computes the scaled noise block 332 based on the selected decoded frame, the selected unit noise block 322, and selected scaling look-up table 184. At step 414, the aggregation engine 190 generates the reconstructed block 392 included in the reconstructed video content 192 based on the selected decoded block 310 and the scaled noise block 332.

In alternate embodiments, the reconstruction application 180, the film grain synthesizer 186, and/or the aggregation engine 190 may generate the reconstructed block 392 based on the decoded video content 142 and the selected film grain parameter sets 170 in any technically feasible fashion. For instance, in some alternate embodiments, the film grain synthesizer 186 does not generate the scaled noise block 132. Instead, the film grain synthesizer 186 generates each entry in the reconstructed block 392 directly based on the corresponding entries in the decoded video content 142, the unit noise block 322, and the scaling look-up table 184. In such embodiments, the method steps 412 and 414 are modified accordingly.

At step 416, the reconstruction application 180 determines whether the selected decoded block 310 is the last decoded block 310 included in the selected decoded frame. If, at step 416, the reconstruction application 180 determines that the selected decoded block 310 is not the last decoded block 310 included in the selected decoded frame, then the method 400 proceeds to step 418. At step 418, the reconstruction application 180 selects the next decoded block 310 included in the selected decoded frame. The method 400 then returns to step 408, where the film grain synthesizer 186 selects the noise template 182 and the scaling look-up table 184 associated with the newly selected decoded block 310.

If, however, at step 416, the reconstruction application 180 determines that the selected decoded block 310 is the last decoded block 310 included in the selected decoded frame, then the method 400 proceeds directly to step 420. At step 420, the reconstruction application 180 determines whether the selected decoded frame is the last decoded frame included in the decoded video content 142. If, at step 420, the reconstruction application 180 determines that the selected decoded frame is not the last decoded frame included in the decoded video content 142, then the method 400 proceeds to step 422. At step 422, the reconstruction application 180 selects the next decoded frame included in the decoded video content 142 and the associated film grain parameter set 170. The method 400 then returns to step 404, where the film grain synthesizer 186 acquires the noise templates 182(1)-182(3) and the scaling look-up tables 184(1)-184(3) associated with the selected film grain parameter set 170. If, however, at step 420, the reconstruction application 180 determines that the selected decoded frame is the last decoded frame included in the decoded video content 142, then the reconstruction application 180 performs operation(s) related to saving the reconstructed video content to a file and/or further processing the reconstructed video content. The method 400 then terminates.

In sum, the disclosed techniques may be used to efficiently reconstruct film grain included in source video content when streaming media titles. The film grain modeling application generates any number of film grain parameter sets in the YCrCb color space based on the source video content and the corresponding de-noised video content. Each film grain parameter set is associated with one or more frames and includes, without limitation, three component-specific template parameter lists and three component-specific scaling parameter lists. Each template parameter list includes, without limitation, correlation coefficients for an auto-regressive model of the zero-mean unit variance film grain. Each scaling parameter list includes, without limitation, a series of points for a piecewise linear scaling function that maps a reduced-noise signal index to a scaling factor for unit variance noise. The video service provider encodes the de-noised video content and transmits the encoded video content and the film grain parameter sets to client devices.

As the client devices receive and decode the encoded video content, a reconstruction application generates reconstructed video content based on the decoded video content and the film grain parameter sets. More specifically, after the reconstruction application receives a film grain parameter set, the reconstruction application generates associated noise templates and associated scaling look-up tables based on, respectively, the template parameter lists and the scaling parameter lists. The reconstruction application processes the decoded video content as decoded blocks. Each decoded block is associated with a different combination of component and spatial portion of a decoded frame. To process a decoded block, the reconstruction application pseudo-randomly selects a unit noise block within the associated noise template. The reconstruction application then computes component-specific reduced-noise signal indices associated with the decoded block based on the portion of the decoded frame corresponding to the decoded block. Subsequently, the reconstruction application determines scaling factors based on the reduced-noise signal indices and the associated scaling look-up table. The reconstruction application then scales the unit noise block based on the scaling factors to generate a scaled noise block. Subsequently, the reconstruction application aggregates the scaled noise block and the decoded block to generate a corresponding reconstructed block of the reconstructed video content. Finally the reconstruction application performs operation(s) related to saving the reconstructed video content to a file and/or further processing the reconstructed video content. For instance, in some embodiments, the reconstruction application streams the reconstructed video content to a playback device that plays back the media title associated with the source video content.

At least one technical advantage of the disclosed techniques relative to prior art solutions is that the disclosed techniques more reliably reconstruct source video content that includes film grain when streaming media titles. Unlike prior art approaches that rely on an unreliable linear scaling assumption to generate synthesized film grain in the RGB color space, the disclosed techniques generate piecewise linear scaling functions for each component in the YCbCr color space. The piecewise linear scaling functions accurately model the correlation between the values of reduced-noise video content derived from the source video content (e.g., the decoded video content) and the intensities of the film grain. Further, because the source video content is typically provided and encoded in the YCbCr color space, generating the synthesized film grain via the disclosed techniques does not involve the time-consuming color space conversions typically required by prior art approaches. In alternate embodiments, the disclosed techniques can be advantageously extended to other brightness-based color spaces or to the RGB color space. In such embodiments, the disclosed techniques increase the accuracy with which the synthesized film grain replicates the actual film grain included in the original source video content relative to prior art solutions. These technical advantages provide one or more technological advancements over the prior art.

1. In some embodiments, a computer-implemented method comprises performing one or more scaling operations on first unit noise based on a first piecewise linear scaling function and a brightness component of decoded video content associated with a media title to generate a brightness component of synthesized film grain; generating a brightness component of reconstructed video content associated with the media title based on the brightness component of the synthesized film grain and the brightness component of the decoded video content; and performing at least one operation related to at least one of saving the reconstructed video content to a file and further processing the reconstructed video content.

2. The computer-implemented method of clause 1, wherein the decoded video content and the first piecewise linear scaling function are derived from source video content associated with the media title.

3. The computer-implemented method of clauses 1 or 2, further comprising generating the first piecewise linear scaling function based on a scaling parameter list that includes a plurality of points, wherein each point specifies a different value for a brightness component of reduced-noise video content associated with the media title and a corresponding value for a brightness component of estimated film grain.

4. The computer-implemented method of any of clauses 1-3, wherein performing the one or more scaling operations comprises mapping a first value for a first sample included in the brightness component of the decoded video content to a scaling factor based on the first piecewise linear scaling function; and multiplying the scaling factor and a second value for a second sample included in the first unit noise to compute an value for a third sample included in the brightness component of the synthesized film grain.

5. The computer-implemented method of any of clauses 1-4, wherein performing the one or more scaling operations comprises, for each sample included in the brightness component of the decoded video content, determining a scaling factor based on a scaling look-up table derived from the first piecewise linear scaling function and generating a corresponding sample included in the brightness component of the synthesized film grain based on the scaling factor and the first unit noise.

6. The computer-implemented method of any of clauses 1-5, further comprising performing one or more scaling operations on second unit noise based on a second piecewise linear scaling function, a color-related component of the decoded video content, and the brightness component of the decoded video content to generate a color-related component of the synthesized film grain; and generating a color-related component of the reconstructed video content based on the color-related component of the synthesized film grain and the color-related component of the decoded video content.

7. The computer-implemented method of any of clauses 1-6, further comprising computing a first reduced-noise signal index based on a color-related component of the decoded video content and the brightness component of the decoded video content; generating a color-related component of the synthesized film grain based on a mapping of the first reduced-noise signal index to a given scaling factor and a second unit noise; and generating a color-related component of the reconstructed video content based on the color-related component of the synthesized film grain and the color-related component of the decoded video content.

8. The computer-implemented method of any of clauses 1-7, further comprising generating a first offset and a second offset; and determining the first unit noise within a noise template based on the first offset and the second offset, wherein the noise template is based on a template parameter list that specifies one or more correlation coefficients for an auto-regressive model associated with film grain.

9. The computer implemented method of any of clauses 1-8, further comprising performing one or more scaling operations on second unit noise based on a second piecewise linear scaling function, a first color-related component of the decoded video content, and the brightness component of the decoded video content to generate a first color-related component of the synthesized film grain; generating a first color-related component of the reconstructed video content based on the first color-related component of the synthesized film grain and the first color-related component of the decoded video content; performing one or more scaling operations on third unit noise based on a third piecewise linear scaling function, a second color-related component of the decoded video content, and the brightness component of the decoded video content to generate a second color-related component of the synthesized film grain; and generating a second color-related component of the reconstructed video content based on the second color-related component of the synthesized film grain and the second color-related component of the decoded video content.

10. The computer-implemented method of any of clauses 1-9, wherein the decoded video content is represented in one of YCbCr color space, Y'CbCr color space, YUV color space, YIQ color space, YPbPr, and ICtCp color space.

11. In some embodiments, one or more non-transitory computer readable media include instructions that, when executed by one or more processors, cause the one or more processors to perform the steps of generating a plurality of components of synthesized film grain based a plurality of piecewise linear scaling functions and a plurality of components of decoded video content associated with a media title; generating a plurality of components of reconstructed video content associated with the media title based on the plurality of components of the synthesized film grain and the plurality of components of the decoded video content; and performing at least one operation related to at least one of saving the reconstructed video content to a file and further processing the reconstructed video content.

12. The one or more non-transitory computer readable media of clause 11, wherein a first piecewise linear scaling function included in the plurality of piecewise linear scaling functions is generated based on de-noised video content derived from source video content associated with the media title and estimated film grain.

13. The one or more non-transitory computer readable media of causes 11 or 12, further comprising generating a first piecewise linear scaling function included in the plurality of piecewise linear scaling functions based on a scaling parameter list that includes a plurality of points, wherein each point specifies a different value for a first component included in a plurality of components of reduced-noise video content associated with the media title and a corresponding value for a first component included in a plurality of components of estimated film grain.

14. The one or more non-transitory computer readable media of any of clauses 11-13, wherein generating a first component included in the plurality of components of the synthesized film grain comprises mapping a first value for a first sample included in a first component included in the plurality of components of the decoded video content to a scaling factor based on a first piecewise linear scaling function included in the plurality of piecewise linear scaling functions; and multiplying the scaling factor and a second value for a second sample included in a first unit noise to compute a value for a third sample included in a first component included in the plurality of components of the synthesized film grain.

15. The one or more non-transitory computer readable media of any of clauses 11-14, wherein generating a first component included in the plurality of components of the synthesized film grain comprises, for each sample included in a first component included in the plurality of components of the decoded video content, determining a scaling factor based on a scaling look-up table derived from a first piecewise linear scaling function included in the plurality of piecewise linear scaling functions and generating a corresponding sample included in a first component included in the plurality of components of the synthesized film grain based on the scaling factor and a first unit noise.

16. The one or more non-transitory computer readable media of any of clauses 11-15, wherein the plurality of components of the decoded video content includes a red color component, a green color component, and a blue color component.

17. The one or more non-transitory computer readable media of any of clauses 11-16, wherein the plurality of components of the decoded video content includes a luma component, a blue-difference color component, component, and a red-difference color component.

18. The one or more non-transitory computer readable media of any of clauses 11-17, further comprising generating the first unit noise based on one or more correlation coefficients for an auto-regressive model associated with film grain.

19. The one or more non-transitory computer readable media of any of clauses 11-18, wherein the plurality of piecewise linear scaling functions is associated with one of RGB color space, YCbCr color space, and ICtCp color space.

20. In some embodiments, a system comprises one or more memories storing instructions; and one or more processors that are coupled to the one or more memories and, when executing the instructions, are configured to generate synthesized film grain based on unit noise, one or more piecewise linear scaling functions associated with a brightness-based color space, and decoded video content associated with a media title; generate reconstructed video content based on the synthesized film grain and the decoded video content; and perform at least one operation related to at least one of saving the reconstructed video content to a file and further processing the reconstructed video content.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   performing one or more scaling operations on first unit noise based on a first piecewise linear scaling function and a brightness component of decoded video content associated with a media title to generate a brightness component of synthesized film grain;
   generating a brightness component of reconstructed video content associated with the media title based on the brightness component of the synthesized film grain and the brightness component of the decoded video content; and
   performing at least one operation related to at least one of saving the reconstructed video content to a file and further processing the reconstructed video content.

2. The computer-implemented method of claim 1, wherein the decoded video content and the first piecewise linear scaling function are derived from source video content associated with the media title.

3. The computer-implemented method of claim 1, further comprising generating the first piecewise linear scaling function based on a scaling parameter list that includes a plurality of points, wherein each point specifies a different value for a brightness component of reduced-noise video content associated with the media title and a corresponding value for a brightness component of estimated film grain.

4. The computer-implemented method of claim 1, wherein performing the one or more scaling operations comprises:
   mapping a first value for a first sample included in the brightness component of the decoded video content to a scaling factor based on the first piecewise linear scaling function; and
   multiplying the scaling factor and a second value for a second sample included in the first unit noise to compute a value for a third sample included in the brightness component of the synthesized film grain.

5. The computer-implemented method of claim 1, wherein performing the one or more scaling operations comprises, for each sample included in the brightness component of the decoded video content, determining a scaling factor based on a scaling look-up table derived from the first piecewise linear scaling function and generating a corresponding sample included in the brightness component of the synthesized film grain based on the scaling factor and the first unit noise.

6. The computer-implemented method of claim 1, further comprising:
   performing one or more scaling operations on second unit noise based on a second piecewise linear scaling function, a color-related component of the decoded video content, and the brightness component of the decoded video content to generate a color-related component of the synthesized film grain; and
   generating a color-related component of the reconstructed video content based on the color-related component of the synthesized film grain and the color-related component of the decoded video content.

7. The computer-implemented method of claim 1, further comprising:
   computing a first reduced-noise signal index based on a color-related component of the decoded video content and the brightness component of the decoded video content;
   generating a color-related component of the synthesized film grain based on a mapping of the first reduced-noise signal index to a given scaling factor and a second unit noise; and
   generating a color-related component of the reconstructed video content based on the color-related component of the synthesized film grain and the color-related component of the decoded video content.

8. The computer-implemented method of claim 1, further comprising:
   generating a first offset and a second offset; and
   determining the first unit noise within a noise template based on the first offset and the second offset, wherein the noise template is based on a template parameter list that specifies one or more correlation coefficients for an auto-regressive model associated with film grain.

9. The computer implemented method of claim 1, further comprising:
   performing one or more scaling operations on second unit noise based on a second piecewise linear scaling function, a first color-related component of the decoded video content, and the brightness component of the decoded video content to generate a first color-related component of the synthesized film grain;
   generating a first color-related component of the reconstructed video content based on the first color-related component of the synthesized film grain and the first color-related component of the decoded video content;
   performing one or more scaling operations on third unit noise based on a third piecewise linear scaling function, a second color-related component of the decoded video content, and the brightness component of the decoded video content to generate a second color-related component of the synthesized film grain; and
   generating a second color-related component of the reconstructed video content based on the second color-related component of the synthesized film grain and the second color-related component of the decoded video content.

10. The computer-implemented method of claim 1, wherein the decoded video content is represented in one of YCbCr color space, Y'CbCr color space, YUV color space, YIQ color space, YPbPr, and ICtCp color space.

11. One or more non-transitory computer readable media including instructions that, when executed by one or more processors, cause the one or more processors to perform the steps of:
   generating a plurality of components of synthesized film grain based a plurality of piecewise linear scaling functions and a plurality of components of decoded video content associated with a media title;
   generating a plurality of components of reconstructed video content associated with the media title based on the plurality of components of the synthesized film grain and the plurality of components of the decoded video content; and
   performing at least one operation related to at least one of saving the reconstructed video content to a file and further processing the reconstructed video content.

12. The one or more non-transitory computer readable media of claim 11, wherein a first piecewise linear scaling function included in the plurality of piecewise linear scaling functions is generated based on de-noised video content derived from source video content associated with the media title and estimated film grain.

13. The one or more non-transitory computer readable media of claim 11, further comprising generating a first piecewise linear scaling function included in the plurality of piecewise linear scaling functions based on a scaling parameter list that includes a plurality of points, wherein each point specifies a different value for a first component included in a plurality of components of reduced-noise video content associated with the media title and a corresponding value for a first component included in a plurality of components of estimated film grain.

14. The one or more non-transitory computer readable media of claim 11, wherein generating a first component included in the plurality of components of the synthesized film grain comprises:
    mapping a first value for a first sample included in a first component included in the plurality of components of the decoded video content to a scaling factor based on a first piecewise linear scaling function included in the plurality of piecewise linear scaling functions; and
    multiplying the scaling factor and a second value for a second sample included in a first unit noise to compute a value for a third sample included in a first component included in the plurality of components of the synthesized film grain.

15. The one or more non-transitory computer readable media of claim 11, wherein generating a first component included in the plurality of components of the synthesized film grain comprises, for each sample included in a first component included in the plurality of components of the decoded video content, determining a scaling factor based on a scaling look-up table derived from a first piecewise linear scaling function included in the plurality of piecewise linear scaling functions and generating a corresponding sample included in a first component included in the plurality of components of the synthesized film grain based on the scaling factor and a first unit noise.

16. The one or more non-transitory computer readable media of claim 11, wherein the plurality of components of the decoded video content includes a red color component, a green color component, and a blue color component.

17. The one or more non-transitory computer readable media of claim 11, wherein the plurality of components of the decoded video content includes a luma component, a blue-difference color component, component, and a red-difference color component.

18. The one or more non-transitory computer readable media of claim 11, further comprising generating the first unit noise based on one or more correlation coefficients for an auto-regressive model associated with film grain.

19. The one or more non-transitory computer readable media of claim 11, wherein the plurality of piecewise linear scaling functions is associated with one of RGB color space, YCbCr color space, and ICtCp color space.

20. A system, comprising:
    one or more memories storing instructions; and
    one or more processors that are coupled to the one or more memories and,
        when executing the instructions, are configured to:
        generate synthesized film grain based on unit noise, one or more piecewise linear scaling functions associated with a brightness-based color space, and decoded video content associated with a
        media title; generate reconstructed video content based on the synthesized film grain and the decoded video content; and
        perform at least one operation related to at least one of saving the reconstructed video content to a file and further processing the reconstructed video content.

* * * * *